United States Patent
Collins et al.

(10) Patent No.: US 9,630,640 B1
(45) Date of Patent: Apr. 25, 2017

(54) INTERLOCKING PRIMARY AND SECONDARY CART ASSEMBLIES WITH LOCK AND RELEASE MECHANISMS

(71) Applicant: Toyota Motor Engineering & Manufacturing North America, Inc., Erlanger, KY (US)

(72) Inventors: Jeffrey M. Collins, Davisburg, MI (US); Andrew S. Ward, Tecumseh, MI (US); Pradeep Balakrishnan, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/877,622

(22) Filed: Oct. 7, 2015

(51) Int. Cl.
B62B 3/18 (2006.01)

(52) U.S. Cl.
CPC .......... *B62B 3/18* (2013.01); *B62B 2202/022* (2013.01); *B62B 2202/48* (2013.01); *B62B 2207/00* (2013.01)

(58) Field of Classification Search
CPC  B62B 3/02; B62B 5/00; B62B 3/1404; B62B 1/08; B62B 3/104; B62B 5/002; B62B 1/264; B62B 3/18
See application file for complete search history.

(56) References Cited

U.S. PATENT DOCUMENTS

| | | | | |
|---|---|---|---|---|
| 2,654,493 A | * | 10/1953 | Kernkamp | B62B 1/264 280/47.34 |
| 3,507,413 A | | 4/1970 | Hobson | |
| 5,320,475 A | * | 6/1994 | Pinder | B62B 1/08 414/343 |
| 5,730,891 A | * | 3/1998 | Karpoff | B23K 37/00 219/136 |
| 5,860,659 A | * | 1/1999 | Hart | B60D 1/00 280/400 |
| 5,944,474 A | * | 8/1999 | Cummins | B62B 3/104 294/119.2 |
| 6,073,942 A | * | 6/2000 | Heneveld, Sr. | B62B 5/00 280/33.991 |
| 6,554,300 B1 | * | 4/2003 | Ziolkowski | B62B 1/264 280/47.27 |

(Continued)

*Primary Examiner* — Hau Phan
(74) *Attorney, Agent, or Firm* — Dinsmore & Shohl LLP

(57) ABSTRACT

An interlocking primary and secondary cart assembly may include a primary cart assembly including a primary support platform configured to support a primary working device and wheels operatively connected to the primary support platform that movably support the primary support platform spaced from a floor and a secondary cart assembly including a secondary support platform configured to support a secondary working device and wheel connected to the secondary platform that moveably support the secondary support platform spaced from the floor. The assembly may further include a lock and release mechanism including a primary lock and release component connected to the primary cart assembly and a secondary lock and release component connected to the secondary cart assembly wherein the secondary lock and release component aligns with the primary lock and release component for locking therewith with the secondary cart assembly positioned on the primary support platform of the primary cart assembly.

20 Claims, 3 Drawing Sheets

(56) References Cited

U.S. PATENT DOCUMENTS

| | | | |
|---|---|---|---|
| 6,698,770 B2 * | 3/2004 | Eriksson | A61G 12/001 280/33.991 |
| 6,799,769 B2 * | 10/2004 | Ziolkowski | B62B 1/264 280/47.27 |
| 7,357,398 B2 | 4/2008 | O'Connor | |
| 7,648,147 B2 * | 1/2010 | Lauer | B62B 3/02 280/47.35 |
| 2003/0218312 A1 * | 11/2003 | Forshee | B62B 5/002 280/304.1 |
| 2005/0116431 A1 * | 6/2005 | Holtan | B62B 3/1404 280/33.992 |
| 2007/0056797 A1 | 3/2007 | Wang | |
| 2010/0021275 A1 | 1/2010 | Ratermann | |

* cited by examiner

INTERLOCKING PRIMARY AND SECONDARY CART ASSEMBLIES WITH LOCK AND RELEASE MECHANISMS

TECHNICAL FIELD

The present specification relates to cart assemblies and more specifically, interlocking primary and secondary cart assemblies with lock and release mechanisms.

BACKGROUND

It is often the case that relatively heavy machines or components of machines must be moved separately, but are then connected together to perform an operation. For example, a user may separately transport a tank and a welder machine when it is desirable to move the welder machine from point A to point B. Such separate moving of relatively heavy objects can provide ergonomics challenges. Accordingly, there exists a need for primary and secondary cart interlocking assemblies for transporting multiple components, where those components may have a use together.

SUMMARY

In one embodiment, an apparatus for an interlocking primary and secondary cart assembly may include a primary cart assembly including a primary support platform configured to support a primary working device thereon and wheels operatively connected to the primary support platform that movably support the primary support platform spaced from a floor and a secondary cart assembly including a secondary support platform configured to support a secondary working device thereon and wheel operatively connected to the secondary platform that moveably support the secondary support platform spaced from the floor. The assembly may further include a lock and release mechanism including a primary lock and release component connected to the primary cart assembly and a secondary lock and release component connected to the secondary cart assembly wherein the secondary lock and release component aligns with the primary lock and release component for locking therewith with the secondary cart assembly positioned on the primary support platform of the primary cart assembly.

In another embodiment, an interlocking primary and secondary cart assembly includes a primary cart assembly having a primary support platform configured to support a primary working device thereon and at least one wheel operatively connected to the primary support platform that movably support the primary support platform spaced from a floor, a secondary cart assembly comprising a secondary support platform configured to support a secondary working device thereon and at least one wheel operatively connected to the secondary platform that moveably support the secondary support platform spaced from the floor and a lock and release mechanism comprising a primary lock and release component connected to the primary cart assembly or the primary working device and a secondary lock and release component connected to the secondary cart assembly wherein the primary support platform of the primary cart assembly is configured to support and connect to the secondary cart assembly and the secondary working device, the secondary lock and release component aligns with the primary lock and release component for locking therewith with the secondary cart assembly positioned on the primary support platform of the primary cart assembly.

In another embodiment, a method of using an interlocking primary and secondary cart assembly including the steps of rotating a secondary cart assembly onto a primary support platform of the primary cart assembly, the primary cart assembly comprising a primary support platform configured to support a primary working device thereon and wheels operatively connected to the primary support platform that movably support the primary support platform spaced from a floor, the secondary cart assembly comprising a secondary support platform configured to support a secondary working device thereon and wheels operatively connected to the secondary platform that moveably support the secondary support platform spaced from the floor and securing the secondary cart assembly to the primary cart assembly using a lock and release mechanism thereby allowing for transportation of the interlocking primary and secondary cart assembly as a one piece assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to an interlocking primary cart assemblies and secondary cart assemblies to provide an interlocked primary and secondary cart assembly that can be transported as a single unit. The interlocked primary and secondary cart assembly includes a lock and release mechanism that can move between a locked configuration, locking the primary cart assembly and the secondary cart assembly, and a release configuration that allows separation of the primary cart assembly from the secondary cart assembly allowing for separate movement of the primary and secondary cart assemblies relative to one another.

The interlocking primary and secondary cart assemblies can provide an improved system for connecting and transporting a welder tank to a welder machine. The primary cart assembly, for example, can be configured to include the welder machine. Similarly, the secondary cart assembly can be configured to include the welder tank for use with the welder machine. The primary cart assembly can be configured to allow the secondary cart assembly to be rotated onto a platform of the primary cart assembly and then secured to the primary cart assembly allowing the entire interlocked primary and secondary cart assembly to be moved together as a one piece assembly during use.

Figure 1:
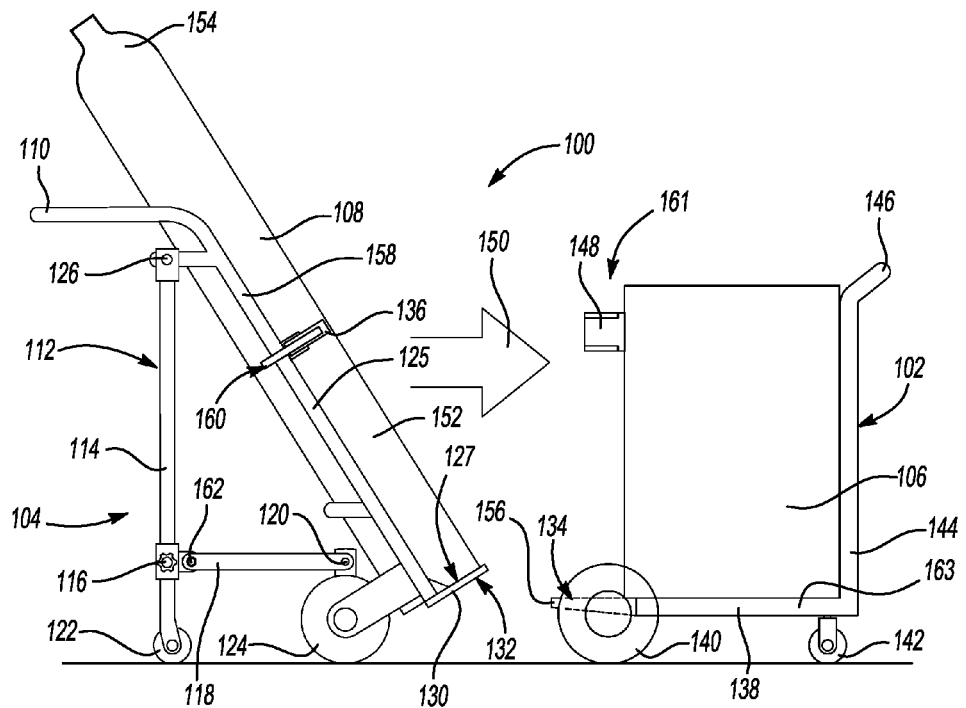
FIG. 1 illustrates a primary cart assembly and a secondary cart assembly in a disconnected configuration moving towards the primary cart assembly according to one or more embodiments shown and described herein.

Referring to FIG. 1, an interlocking primary and secondary cart assembly 100 includes a primary cart assembly 102 and a secondary cart assembly 104. In a general sense, the secondary cart assembly 104 is adapted to rest on and travels with the primary cart assembly 102. The primary cart assembly 102 has a primary support platform 138 that is configured to hold the welding machine 106 or other working device in a generally permanent fixed position. The secondary cart assembly 104 is configured to hold a tank 108 or other working device which supplies fuel or otherwise interacts with the welding machine 106.

Figure 4:
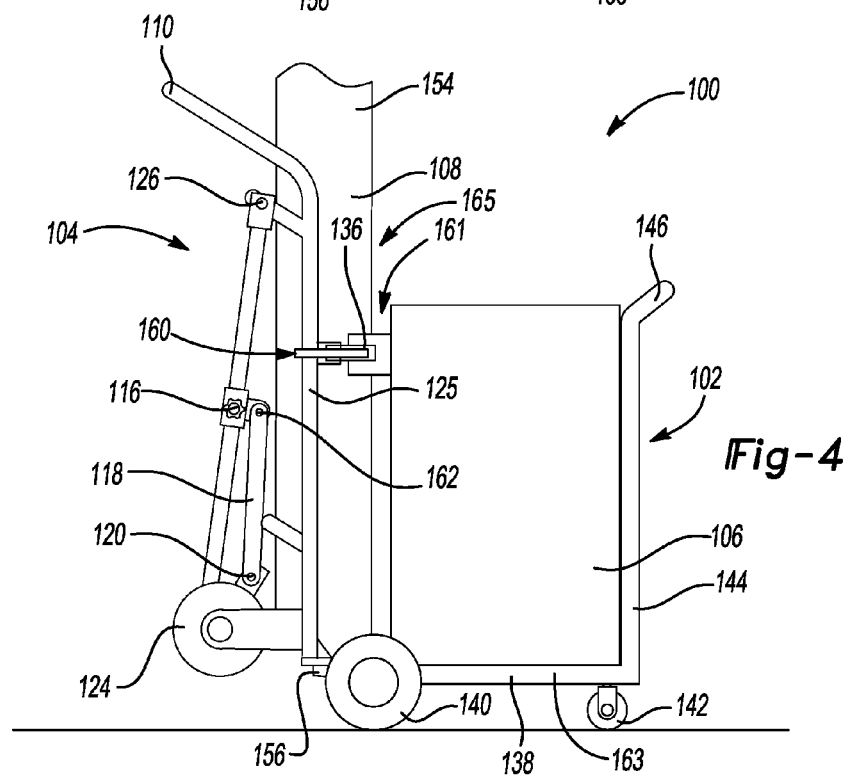
FIG. 4 illustrates the interconnected primary and secondary cart assembly with the secondary cart assembly in a folded-in position according to one or more embodiments shown and described herein.

The secondary cart assembly 104 includes a handle 110 and a support structure 112 including support beams 114, 118. The support beams 114, 118 are connected by a pivot point 162 and include a locking mechanism 116. The support beams 114, 118 connect to a main cart portion 125 at pivot points 120, 126 and allow the support structure 112 to fold in to a compressed configuration, such as illustrated in FIG. 4. The secondary cart assembly 104 includes a plurality of wheels 122, 124 allowing the user to more readily push the secondary cart assembly 104 from a first position to a second position. The wheels 122, 124 also support a secondary support platform 130 at a location above the floor and allow pivoting of the secondary support platform 130 relative to the floor.

The secondary cart assembly 104 includes the secondary support platform 130 allowing the tank 108 to rest on the secondary support platform 130. The tank 108 includes an upper end 154 and a lower end 152. The lower end 152 is adapted to rest on an upper surface 127 of the secondary support platform 130.

The secondary cart assembly 104 further includes a secondary lock and release mechanism 160. The secondary lock and release mechanism 160 includes a latch 136. The latch 136 is adapted to connect to a primary lock and release component 161 comprising a hook 148 provided on the welding machine 106. Alternatively, the hook 148 may be connected directly to the primary car assembly 102 including the welding machine 106.

The primary cart assembly 102 includes a lower support structure 163 comprising the primary support platform 138 and a side support structure 144 comprising a handle 146. The support structure 138 is adapted to hold the welding machine 106 on the primary support platform 138. The primary cart assembly 102 further includes the handle 146 and a plurality of wheels 140, 142. The plurality of wheels 140, 142 support the primary support platform 138 at a location above the floor. The primary support platform 138 extends to an extended support structure 156 having an upper surface 134. The extended support structure 156 extends forward, beyond the wheels 142, and is arranged to engage with a lower surface 132 of the platform 130 of the secondary cart assembly 104 as will described in greater detail below.

Figure 2:
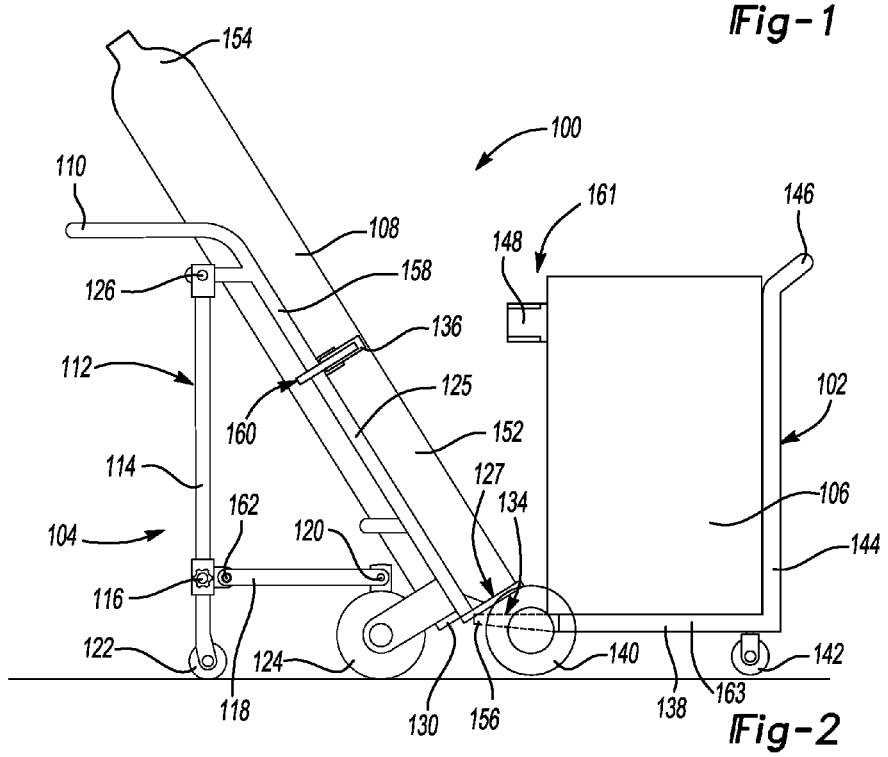
FIG. 2 illustrates the primary cart assembly and the secondary cart assembly in an intermediate configuration positioned to rotate onto the primary cart assembly for interlocking therewith according to one or more embodiments shown and described herein.

FIGS. 1-4 illustrate the secondary cart assembly 104 rotating onto the primary cart assembly 102 and locking the secondary cart assembly 104 to a locked configuration. The directional arrow 150, as illustrated in FIG. 1, illustrates the secondary cart assembly 104 moving towards the primary cart assembly 102. FIG. 2 illustrates an intermediate second position before rotation where the platform 130 begins to come into contact with the extended support structure 156 of the primary cart assembly 102. In this example, the secondary support platform 130 is rotated to an elevation at least partially above the extended support structure 156 and is used as a lever to raise the tank 108 onto the primary support platform 138.

Figure 3:
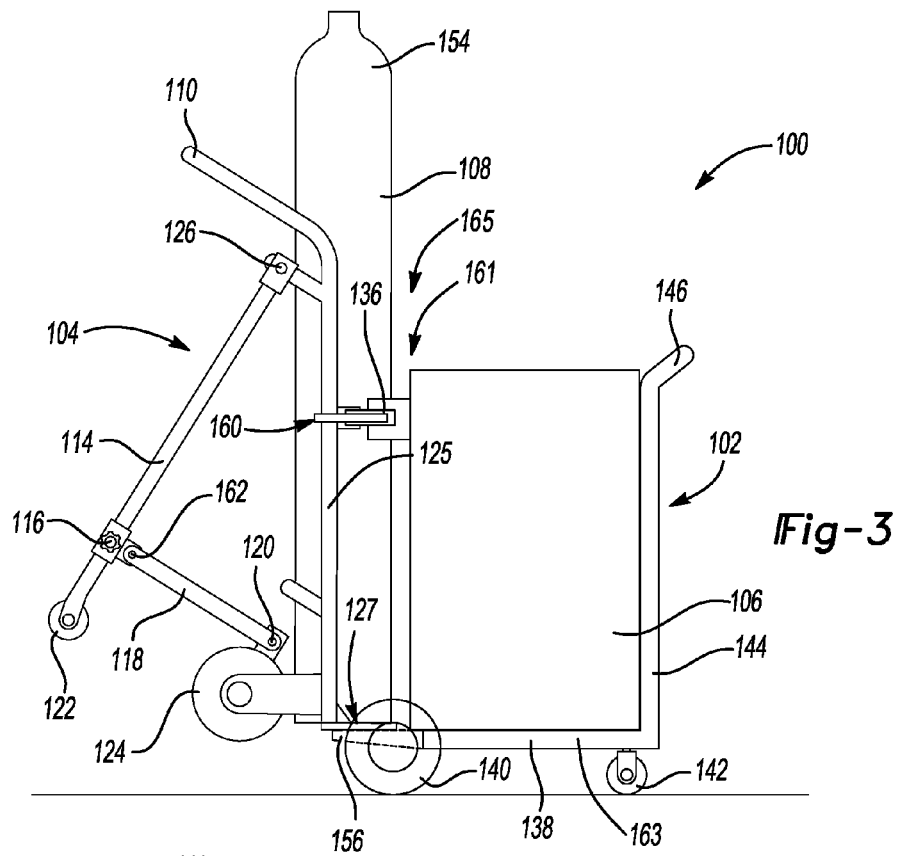
FIG. 3 illustrates the primary cart assembly and the secondary cart assembly interlocked forming an interconnected primary and secondary cart assembly according to one or more embodiments shown and described herein.

FIG. 3 illustrates the secondary cart assembly 104 rotating onto the primary support platform 156 of the primary cart assembly 102. After the secondary cart assembly 104 is rotated up and onto the primary cart assembly 102, the secondary cart assembly 104 can be locked to the primary cart assembly 102. As can be seen, the lock and release mechanism 165 includes the primary lock and release component 161 and secondary lock and release mechanism 160 that align the secondary cart assembly 104 on the support platform 138 of the primary cart assembly 102. Once the secondary cart assembly 104 is locked to the welding machine 106, the support structure 112 of the secondary cart assembly 104 may be moved to a compressed configuration, such as illustrated in FIG. 4.

Figure 5:
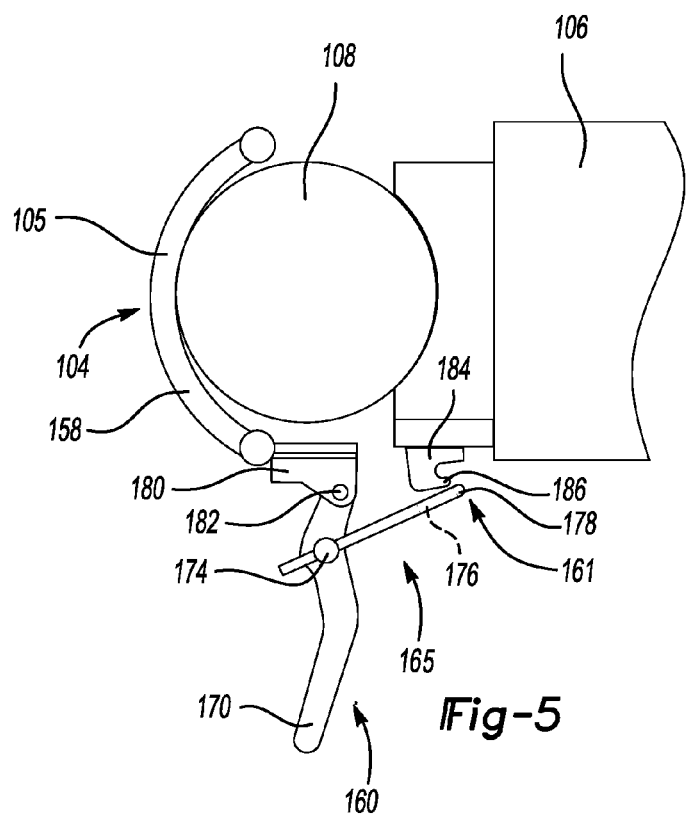
FIG. 5 illustrates a top view of the interlocked primary and secondary cart assembly before the secondary cart assembly is secured to the primary cart assembly according to one or more embodiments shown and described herein.
Figure 6:
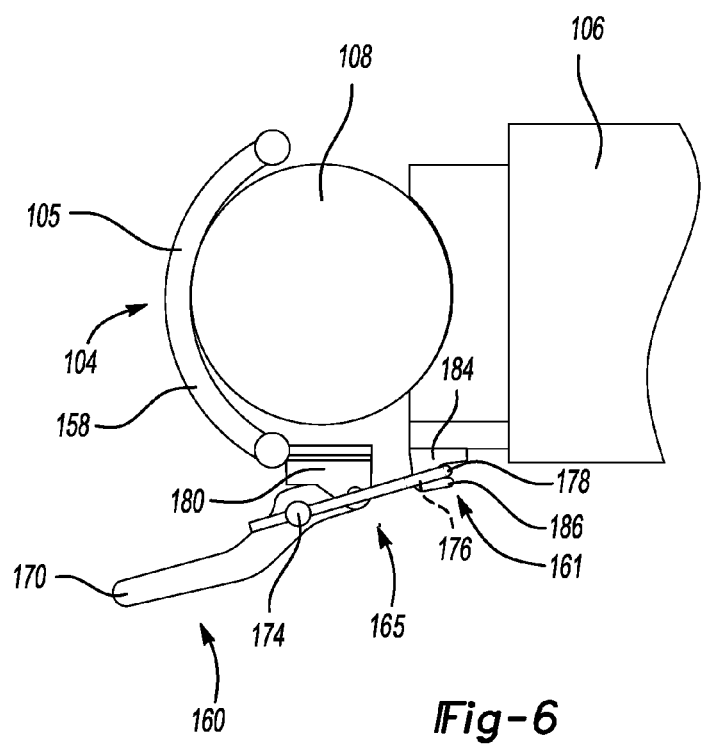
FIG. 6 illustrates a top view of the interlocked primary and secondary cart assembly after securement of the secondary cart assembly to the primary cart assembly according to one or more embodiments shown and described herein.

The lock and release mechanism 165 is illustrated in further detail in FIGS. 5 and 6. FIG. 5 illustrates the lock and release mechanism 165 before the latch 136 has been engaged. FIGS. 5 and 6 illustrate the secondary cart assembly 104 holding the tank 108 after the secondary cart assembly 104 has been rotated onto the primary support platform 138 of the primary cart assembly 102. The primary support platform 138 has a sufficient surface area to accept the platform 130. Specifically, primary support platform 138 may have at least 3 times the length of the platform 130. Further, when rotating the platform 130 onto the primary support platform 138, there can be an at least ⅓ overlap of the second support platform 130 over the extended support structure 156 (such as shown in FIG. 2) to allow the user to gain sufficient rotation and leverage.

The secondary cart assembly 104 can include a cradle structure 105 configured to hold the tank 108. The secondary cart assembly 104 includes the secondary lock and release component 160. The secondary lock and release component 160 includes a handle 170 pivotally connected to the latch 176. The latch 176 is connected to the handle 170 at a pivot point 174. The latch 176 includes an aperture 178 arranged to connect with the hook 184 of the welding machine 106. The latching mechanism 160 is connected to the secondary cart assembly 104 by means of a connector portion 180. The primary cart assembly 102 (or the welding machine 106) includes the primary lock and release component 161 including the hook 184 having a hook portion 186. The hook portion 186 is arranged to connect with the aperture 176 of the latch 174.

In an unlocked configuration, as illustrated in FIG. 5, the lock and release mechanism 165 is illustrated before securement. FIG. 6 illustrates the lock and release mechanism 165 in a secured and locked position where the latch 176 is provided over and connected to the hook 184. In some embodiments, the hook 184 may be connected directly to the primary cart assembly 102 rather than connected directly to the welding machine 106.

The secondary lock and release component 160 can be provided approximately midway up the secondary cart assembly 104. The latching mechanism 160 can be provided at this location to be convenient to the user allowing the user to easily lock and secure the latching mechanism 160. Further, the secondary lock and release component 160 can be provided at the upper end of the welding machine 106 to raise the center of gravity and provide a more secure connection of the tank cart to the primary cart assembly 102.

Accordingly, provided herein is an improved cart assembly for moving relatively heavy objects. Specifically, the present specification provides for a primary and secondary cart interlocking assemblies for transporting multiple components, where those components may have a use together, such as a welding machine and a corresponding tank. The primary and secondary cart interlocking assemblies allow for simultaneous movement of the primary cart assembly and the secondary cart assembly as a single assembly thereby wielding improved ergonomics to the user.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An interlocking primary and secondary cart assembly comprising:
    a primary cart assembly comprising a primary support platform configured to support a primary working device thereon and wheels operatively connected to the primary support platform that movably support the primary support platform spaced from a floor;
    a secondary cart assembly comprising a secondary support platform configured to support a secondary working device thereon and wheels operatively connected to the secondary platform that moveably support the secondary support platform spaced from the floor; and
    a lock and release mechanism comprising a primary lock and release component connected to the primary cart assembly and a secondary lock and release component connected to the secondary cart assembly;
    wherein the secondary lock and release component aligns with the primary lock and release component for locking therewith with the secondary cart assembly positioned on the primary support platform of the primary cart assembly.

2. The interlocking primary and secondary cart assembly of claim 1 wherein the secondary cart assembly includes a foldable support structure.

3. The interlocking primary and secondary cart assembly of claim 2 wherein the foldable support structure is supported by at least one secondary wheel, the secondary wheel movable to a folded position when the secondary cart assembly is connected to the primary cart assembly.

4. The interlocking primary and secondary cart assembly of claim 3 wherein the secondary wheel is pivotally connected to the secondary cart assembly.

5. The interlocking primary and secondary cart assembly of claim 1 where the lock and release mechanism includes a handle, the handle rotatable from an unlocked to a locked position.

6. The interlocking primary and secondary cart assembly of claim 1 wherein the lock and release mechanism includes an aperture and a hook, the hook positioned on one of the primary cart assembly or the secondary cart assembly, the aperture positioned on the other of the primary cart assembly or the secondary cart assembly.

7. The interlocking primary and secondary cart assembly of claim 1 wherein the primary cart assembly is configured to hold a welding machine.

8. The interlocking primary and secondary cart assembly of claim 7 wherein the secondary cart assembly is configured to hold a tank, the tank connectable to the welding machine.

9. An interlocking primary and secondary cart assembly comprising:
    a primary cart assembly comprising a primary support platform configured to support a primary working device thereon and at least one wheel operatively connected to the primary support platform that movably support the primary support platform spaced from a floor;
    a secondary cart assembly comprising a secondary support platform configured to support a secondary working device thereon and at least one wheel operatively connected to the secondary platform that moveably support the secondary support platform spaced from the floor; and
    a lock and release mechanism comprising a primary lock and release component connected to the primary cart assembly or the primary working device; and
    a secondary lock and release component connected to the secondary cart assembly;
    wherein the primary support platform of the primary cart assembly is configured to support and connect to the secondary cart assembly and the secondary working device, the secondary lock and release component aligns with the primary lock and release component for locking therewith with the secondary cart assembly positioned on the primary support platform of the primary cart assembly.

10. The interlocking primary and secondary cart assembly of claim 9 wherein the primary support platform of the primary cart assembly is configured to support the secondary cart assembly and the secondary working device.

11. The interlocking primary and secondary cart assembly of claim 9 wherein the primary support platform of the primary cart assembly is configured to support the secondary platform, the secondary cart assembly and the secondary working device.

12. The interlocking primary and secondary cart assembly of claim 9 wherein the primary cart assembly is configured to hold a welder machine, the primary support platform of the primary cart assembly having an upper surface area configured to support both the welder machine and the secondary cart assembly.

13. The interlocking primary and secondary cart assembly of claim 12 where the upper surface area of the primary cart assembly is further configured to support a tank connected to the secondary cart assembly.

14. The interlocking primary and secondary cart assembly of claim 9 wherein the lock and release mechanism is generally positioned at a midway point on the secondary cart assembly.

15. The interlocking primary and secondary cart assembly of claim 9 wherein the primary cart assembly is configured to hold a welding machine.

16. The interlocking primary and secondary cart assembly of claim 15 wherein the secondary cart assembly is configured to hold a tank, the tank connectable to the welding machine.

17. A method of using an interlocking primary and secondary cart assembly comprising the steps of:

rotating a secondary cart assembly onto a primary support platform of the primary cart assembly, the primary cart assembly comprising a primary support platform configured to support a primary working device thereon and wheels operatively connected to the primary support platform that movably support the primary support platform spaced from a floor, the secondary cart assembly comprising a secondary support platform configured to support a secondary working device thereon and wheels operatively connected to the secondary platform that moveably support the secondary support platform spaced from the floor; and securing the secondary cart assembly to the primary cart assembly using a lock and release mechanism thereby allowing for transportation of the interlocking primary and secondary cart assembly as a one piece assembly.

18. The method of claim 17 further comprising the step of securing the secondary cart assembly to the primary cart assembly by connecting a primary lock and release component to a secondary lock and release component.

19. The method of claim 18 further comprising the step of aligning the primary lock and release component to the secondary lock and release component prior to securing the secondary cart assembly to the primary cart assembly.

20. The method of claim 17 further comprising the step of transporting by rolling of the interlocking primary and secondary cart assembly as a one piece assembly.

* * * * *